(12) United States Patent
Phan et al.

(10) Patent No.: US 12,055,177 B2
(45) Date of Patent: Aug. 6, 2024

(54) CAPTIVE FASTENER WITH PUSH OUT PIN AND HOLD OUT CLIP

(71) Applicant: Fastener Technology Corporation, North Hollywood, CA (US)

(72) Inventors: Benjamin Phan, Arcadia, CA (US); Simon Ly, Rosemead, CA (US); An Tran, Rosemead, CA (US); Patrick Tran, Arcadia, CA (US); Yuriy Bern, No. Hollywood, CA (US); Larisa Zilber, Northridge, CA (US); Jeffrey Hang, Rosemead, CA (US); Dennis Suedkamp, Porter Ranch, CA (US)

(73) Assignee: Fastener Technology Corporporation, North Hollywood, CA (US)

( * ) Notice: Subject to any disclaimer, the term of this patent is extended or adjusted under 35 U.S.C. 154(b) by 441 days.

(21) Appl. No.: 17/204,794

(22) Filed: Mar. 17, 2021

(65) Prior Publication Data
US 2021/0310506 A1    Oct. 7, 2021

Related U.S. Application Data

(60) Provisional application No. 63/004,080, filed on Apr. 2, 2020.

(51) Int. Cl.
*F16B 39/06* (2006.01)
*F16B 5/02* (2006.01)

(52) U.S. Cl.
CPC ............ *F16B 5/0266* (2013.01); *F16B 39/06* (2013.01)

(58) Field of Classification Search
CPC .................. F16B 39/04; F16B 39/06

USPC .................. 411/315–318, 321–322
See application file for complete search history.

(56) References Cited

U.S. PATENT DOCUMENTS

| | | | | |
|---|---|---|---|---|
| 436,380 A * | 9/1890 | Reagan | .................. | F16B 39/06 411/219 |
| 514,623 A * | 2/1894 | King | .................. | F16B 39/06 411/925 |
| 953,545 A * | 3/1910 | Peiffer | .................. | F16B 39/04 411/946 |
| 1,047,542 A * | 12/1912 | Lofland | .................. | F16B 39/06 411/948 |
| 1,129,787 A * | 2/1915 | Brighgt | .................. | F16B 39/06 411/948 |
| 1,225,932 A * | 5/1917 | Davidson | .............. | F16B 41/002 403/324 |
| 1,346,975 A * | 7/1920 | Petriw | .................. | F16B 39/04 411/946 |
| 1,387,172 A * | 8/1921 | Postel | .................. | F16B 39/32 411/948 |
| 1,508,316 A * | 9/1924 | Brune | .................. | F16B 39/24 411/926 |

(Continued)

*Primary Examiner* — William D Hutton, Jr.
*Assistant Examiner* — Dil K. Magar
(74) *Attorney, Agent, or Firm* — Fulwider Patton LLP

(57) ABSTRACT

A captive fastener is disclosed having a longitudinal slot along the shank for receiving a hold-out clip, and a chamber that houses a retractable push out pin. The push out pin is spring actuated to extend out of the shank and can be retracted into the cavity against the bias of the spring to pass through a primary panel and subpanel. The push out pin is shaped to bear against a counterbore and secure the fastener within a panel while other components are affixed to the fastener.

6 Claims, 8 Drawing Sheets

(56) References Cited

U.S. PATENT DOCUMENTS

| | | | | |
|---|---|---|---|---|
| 2,361,491 A | * | 10/1944 | Nagin | F16B 21/125 411/347 |
| 2,367,399 A | * | 1/1945 | Isakson | F16B 39/06 411/277 |
| 2,730,154 A | * | 1/1956 | Aspey | F16B 39/32 411/948 |
| 3,173,740 A | * | 3/1965 | Barnes | H01R 13/08 411/361 |
| 3,617,991 A | * | 11/1971 | Shlesinger, Jr. | H01R 13/633 439/872 |
| 3,645,160 A | * | 2/1972 | Artioli | F16B 2/248 411/347 |
| 3,742,807 A | * | 7/1973 | Manning | F16B 21/086 269/48.2 |
| 4,553,890 A | * | 11/1985 | Gulistan | F16B 5/0208 411/347 |
| 4,759,671 A | * | 7/1988 | Duran | F16B 21/125 411/347 |
| 5,193,956 A | * | 3/1993 | Duran | F16B 13/068 411/33 |
| 5,224,806 A | * | 7/1993 | Duran | F16B 41/002 411/33 |
| 5,802,795 A | * | 9/1998 | Myers | E04G 17/045 52/745.1 |
| 5,947,668 A | * | 9/1999 | Thommes | F16B 39/34 411/304 |
| 6,872,039 B2 | * | 3/2005 | Baus | F16B 21/125 411/347 |
| 7,147,420 B2 | * | 12/2006 | Baus | F16B 19/109 411/347 |
| 7,462,008 B2 | * | 12/2008 | Attanasio | F16B 5/0208 411/111 |
| 2006/0182514 A1 | * | 8/2006 | Ito | F16B 5/02 411/340 |
| 2011/0033262 A1 | * | 2/2011 | Gulistan | F16B 5/0208 411/347 |
| 2015/0369275 A1 | * | 12/2015 | Hsieh | F16B 39/06 411/322 |

* cited by examiner

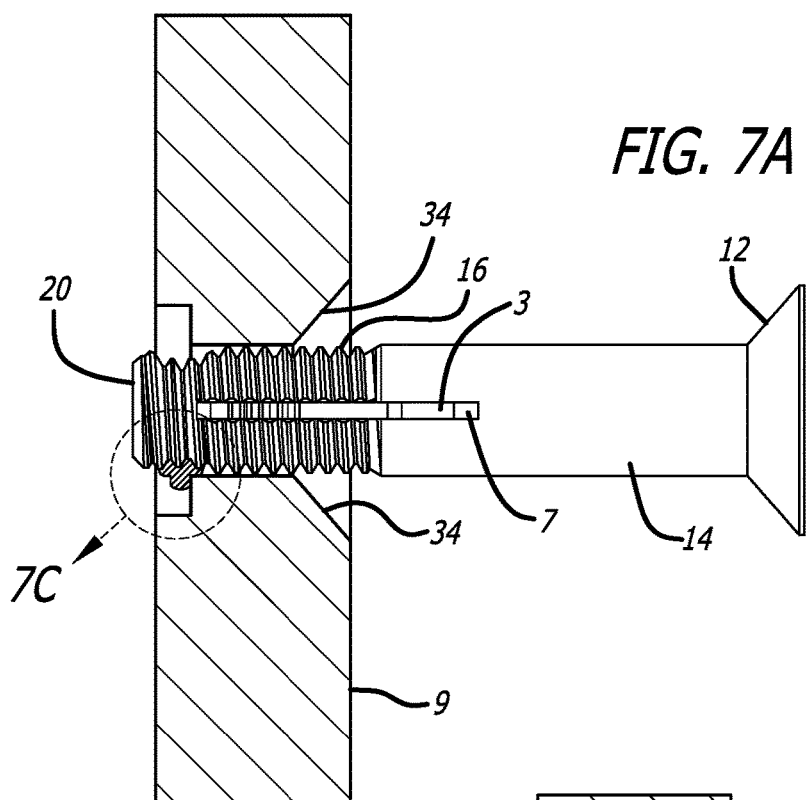
*FIG. 7A*
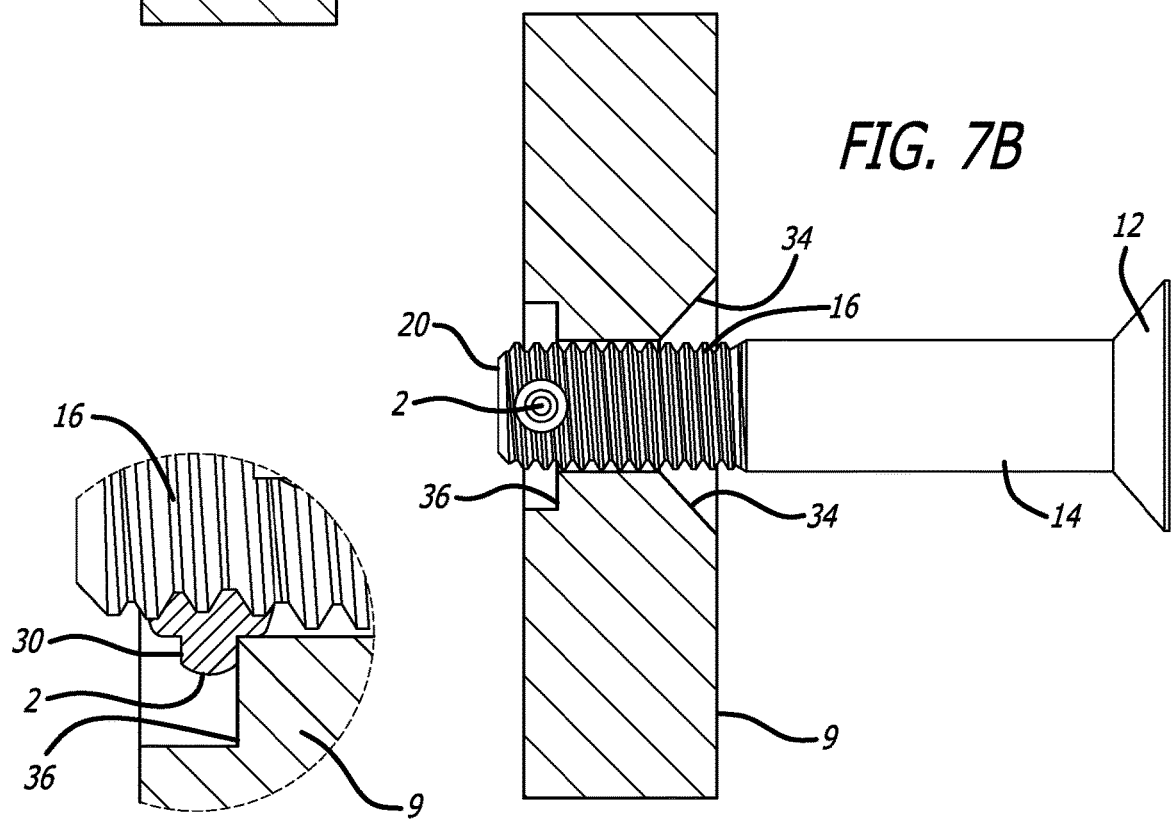
*FIG. 7B*
*FIG. 7C*

CAPTIVE FASTENER WITH PUSH OUT PIN AND HOLD OUT CLIP

CROSS-REFERENCES TO RELATED APPLICATIONS

This application claims priority from U.S. Provisional Patent Application No. 63/004,080, filed Apr. 2, 2020, the content of which is incorporated by reference herein in its entirety.

BACKGROUND OF THE INVENTION

Captive screws are used for many applications, including securing panels and walls having limited access the opposite side of the screw assembly due to the presence of another wall/panel. Captive screw assemblies are typically comprised of a captive screw, along with a flat washer &/or lock washer or retainer. Threads on captive screws are eliminated under the head for a portion of the length, so that once the threaded portion extends through a panel with a washer on the other side, the screw will not fall out. Captive screws are most often used to secure panels because the fastener remain in place even when the fastener starts to loosen. When coupled with a lock washer and/or captive washer, the combination provides a more secure and broader fastening surface to the panel while inhibiting the screw from counter-rotating. Also, if provided with a retainer, the assembly may be held into the panel by pressing or swaging the retainer, such that the screw is prevented from falling out by the retainer.

The present invention is a specialized captive fastener that can work with a counterbore to secure the fastener from the opposite side of a panel, and also allows the fastener to enter a subpanel and maintain its position while being secured.

SUMMARY OF THE INVENTION

The present invention is a captive fastener such as a threaded bolt or screw with an elongate slot along the shank through which a cantilevered hold-out clip extends. The shank further comprises a cavity near the end of the shaft that houses a retractable, spring-activated push out pin. The push out pin is biased by the spring to extend out of the shank perpendicular to the surface, but can be retracted into the cavity against the bias of the spring for clearance to allow the fastener to pass through a primary panel and a secondary. The push out pin in one preferred embodiment is cylindrical with frustro-conical sections that narrow in the radially outward direction.

These and other features of the invention will best be understood with reference to the FIGURES and the detailed description of the invention below.

BRIEF DESCRIPTION OF THE DRAWINGS

FIG. 7A is a cross sectional front view of the embodiment of FIG. 1 against the counterbore of the panel;
FIG. 7B is a cross sectional side view of the embodiment of FIG. 1 against the counterbore of the panel;
FIG. 7C is an enlarged section of the push out pin engaging the panel and the reduced section of the shank.

DETAILED DESCRIPTION OF THE PREFERRED EMBODIMENTS

Figure 1:
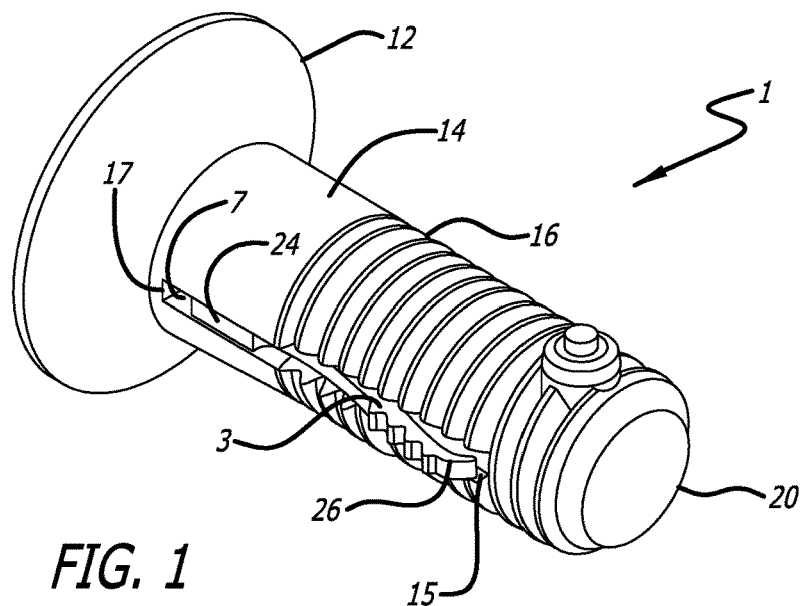
FIG. 1 is an elevated, perspective view of a first embodiment of the present invention.

The present invention relates to a captive fastener with a spring push out pin and a hold-out clip. FIG. 1 illustrates a first preferred embodiment of the present invention, comprising a fastener 1 having a head 12, a neck 14, and a threaded shank 16. The shank 16 is formed with an elongate slot 7 extending from a position 15 spaced from the end 20 of the shank to a position 17 at a juncture of the head 12 and neck 14, the elongate slot 7 being is sized to receive and retain a hold-out clip 3. The hold-out clip 3 is cantilevered at a first end 24 and has a free end 26 that slightly protrudes from the slot 7 and acts as a leaf spring to apply a radial outward force against an interfering structure.

Figure 2:
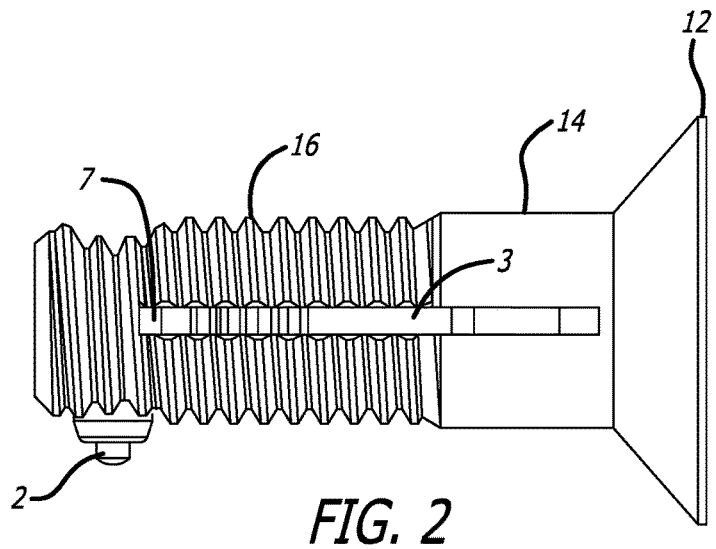
FIG. 2 is a front view of the embodiment of FIG. 1.
Figure 3:
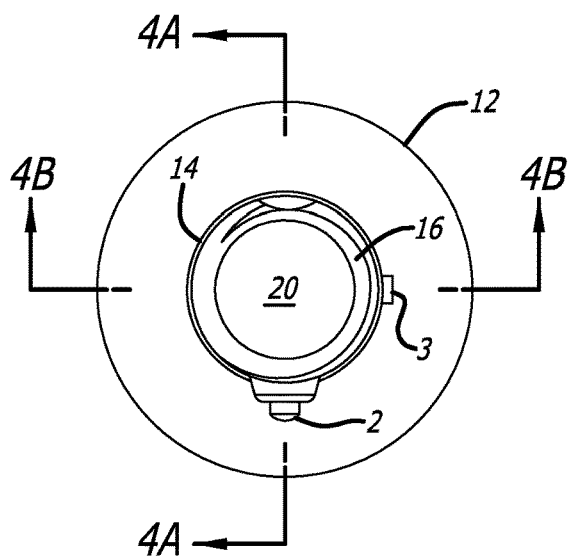
FIG. 3 is a top view of the embodiment of FIG. 1.

FIG. 2 illustrates the embodiment of FIG. 1 from a front view, depicting the slot 7 and the hold-out clip 3 within the slot. Additionally shown is a push out pin 2 that projects from the shank 16 at a concave recess 32 in the shank 16. FIG. 3 shows the view looking down the shank 16, where the hold-out clip 3 and the push out pin 2 are shown extending outward at approximately ninety degrees apart, although other angular offsets are within the scope of the invention.

Figure 4A:
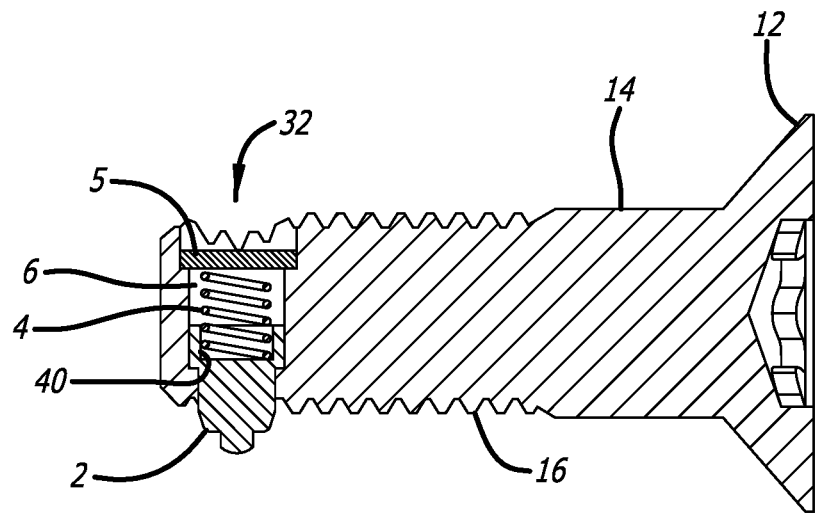
FIG. 4A is a cross sectional front view of the embodiment of FIG. 1 taken along line A-A of FIG. 3.
Figure 4B:
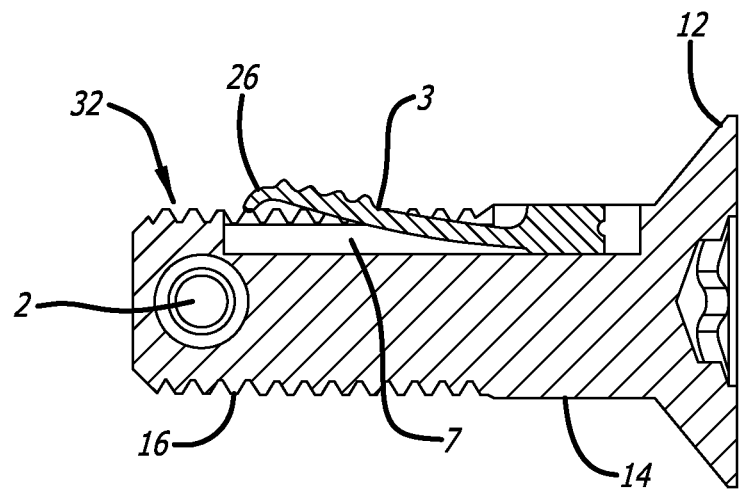
FIG. 4B is a cross-sectional side view of the embodiment of FIG. 1 taken along line B-B of FIG. 3.
Figure 5A:
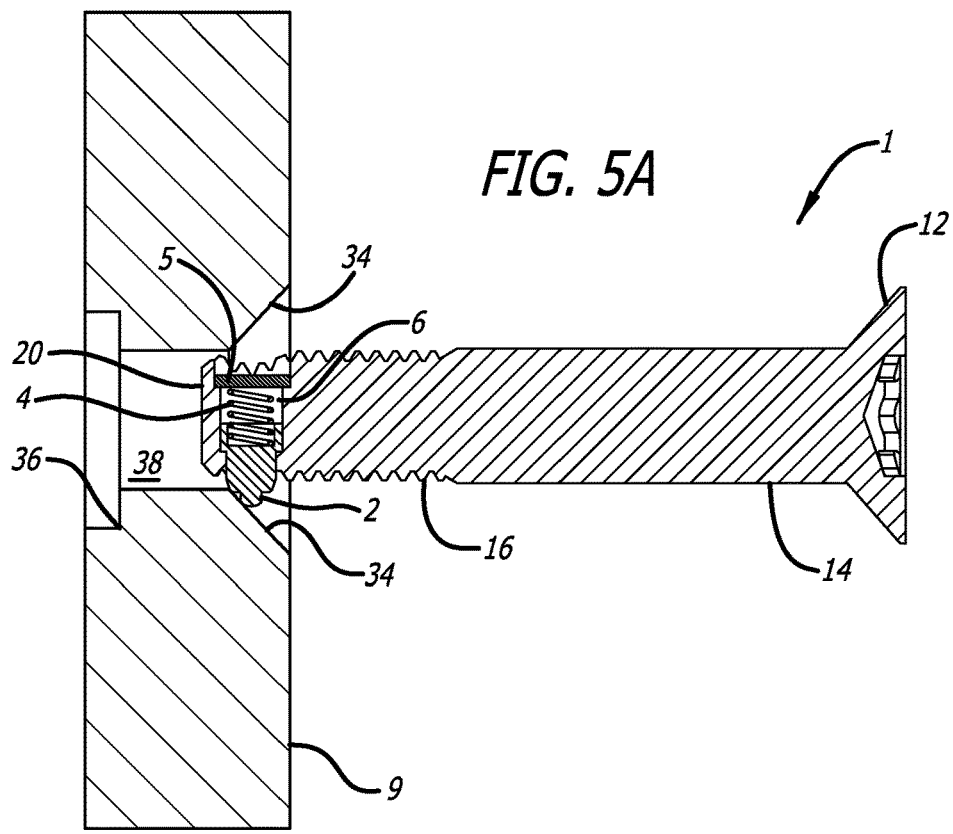
FIG. 5A is a cross sectional front view of the embodiment of FIG. 1 entering a panel.
Figure 5B:
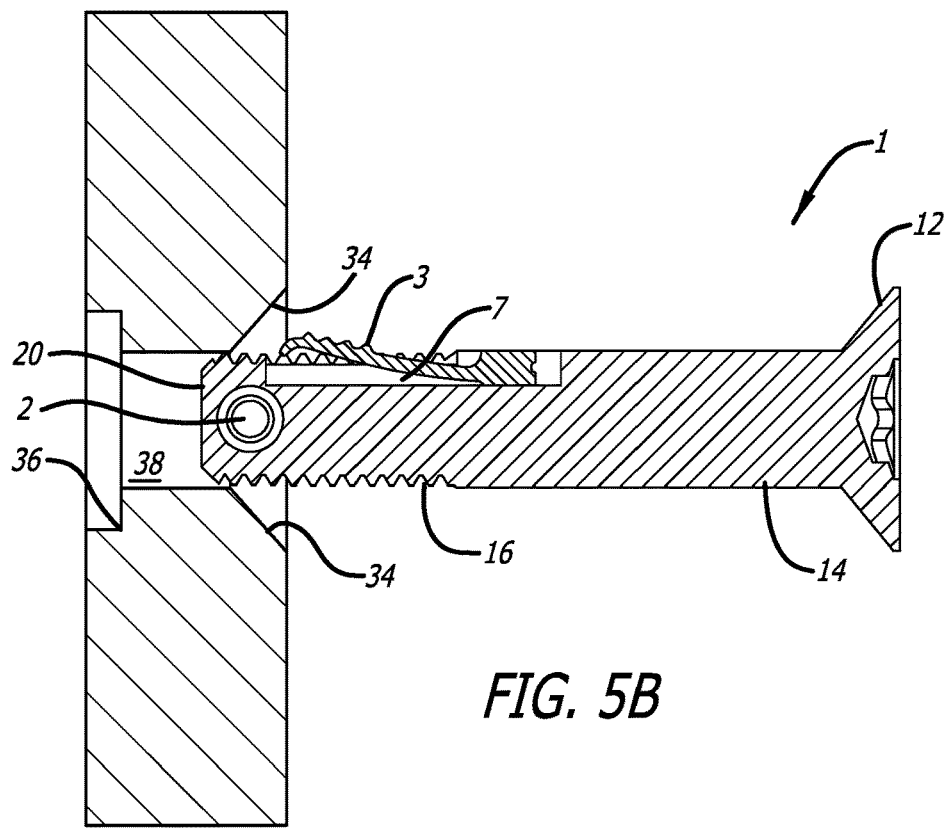
FIG. 5B is a cross sectional side view of the embodiment of FIG. 1 entering a panel.

FIGS. 4A, 4B are a cross sectional views that illustrate the components of the push out pin 2 within a chamber 6 and the hold out clip 3 within the slot 7. The push out pin 2 is located inside a chamber 6 at a location 32 of the shank where the circumference of the shank 16 is flattened or shaped to be slightly concave. A press fit plug 5 is placed in the chamber 6 for the compression spring 4 to bear against, and the spring 4 engages a shoulder 40 on the push out pin 2 to apply a radially outward force on the pin. The chamber 6 is deep enough that the entire push out pin 2 can be retracted into the chamber 6 against the opposing force of the spring 4 so that the shank 16 may enter a circular aperture in a panel sized to receive the shank of the fastener 1. The configuration of the hold-out clip 3 within the slot 7 is also shown in FIG. 4B, where the depth of the slot 7 is adequate to allow the clip 3 to withdraw into the slot 7 in the presence of a radial force.

FIGS. 5-10 illustrate the sequence wherein the present invention is used to secure two panels. FIGS. 5A,B show the fastener 1 inserted into a primary or top panel 9 that may have a configurable beveled recess 34 to receive a configurable head 12 of the fastener 1. Opposite the beveled recess 34 is a counterbore 36, and in between the counterbore 36 and the beveled recess 34 is a circular aperture 38 sized to receive the neck 14 of the fastener 1. As the fastener enters the beveled recess 34 and passes through the circular aperture, the bowed shape of the distal end of the hold-out clip 3 interferes with the inner surface of the circular aperture 38 and drives the hold-out clip 3 into the slot 7 against the bias of the cantilever. Similarly, the recess 34 and then the inner surface of the circular aperture 38 of the panel make contact with the push out pin 2 and cause the push out pin 2 to recede against the bias of the compression spring 4 into the chamber 6. The receding of the push out pin 2 and the clip 3 into the chamber 6 and slot 7, respectively, permits the fastener 1 to enter and pass through the circular aperture 38 of the panel 9 (see FIGS. 6A,B).

Figure 6A:
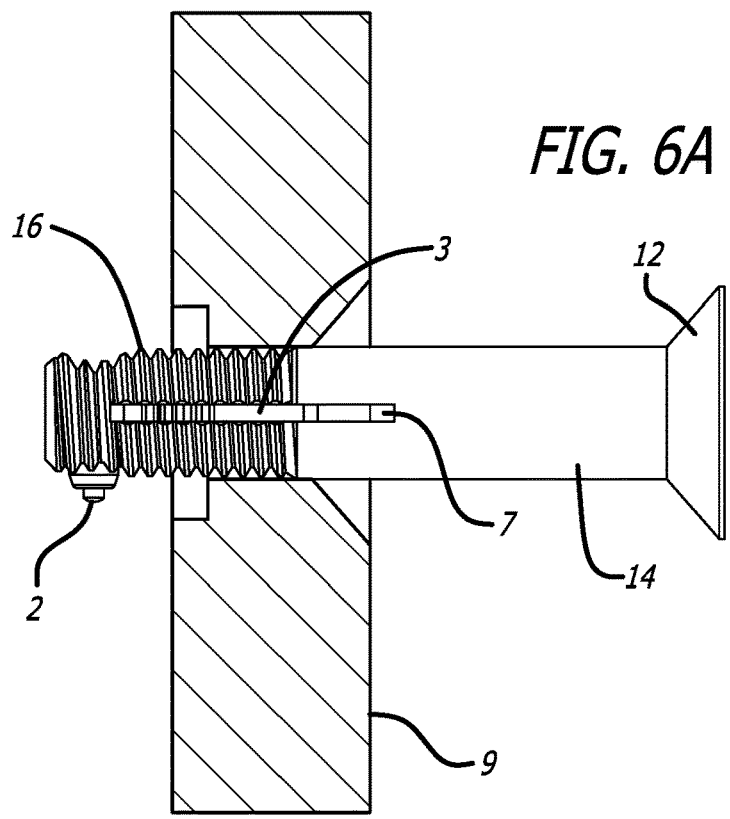
FIG. 6A is a cross sectional front view of the embodiment of FIG. 1 having passed through the panel.
Figure 6B:
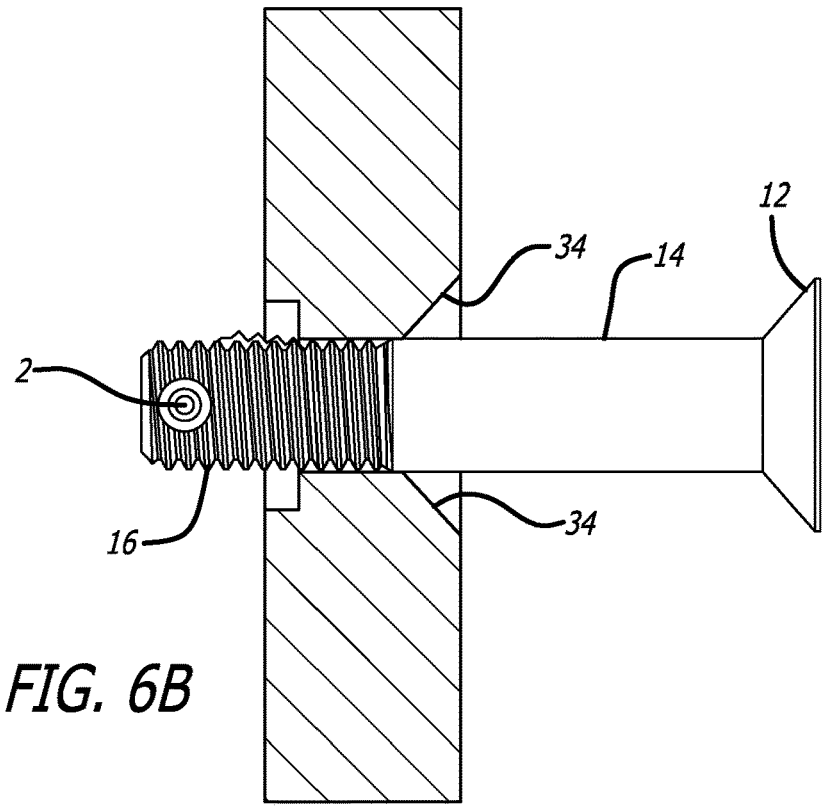
FIG. 6B is a cross sectional side view of the embodiment of FIG. 1 having passed through the panel.

FIGS. 6A,B illustrate the fastener 1 after it passes through the panel 9. The hold-out clip 3 has returned to its position partially outside of the slot 7, and the push out pin 2 has extended radially outward from the chamber 6 under the influence of the compression spring 4.

FIGS. 7A,B illustrate how the hold-out clip 3 can fix the fastener 1 in the circular aperture 38 of the panel by applying an outwardly directed force against the circular aperture. This outward force is sufficient to fix the fastener 1 within the panel and maintain a substantially perpendicular orientation as shown so that a nut or other securing device can be added. Once the fastener 1 has been passed through the panel 9 as shown in FIG. 6A,B, it can be withdrawn in the opposite direction until the push out pin 2 bears against the circular aperture 38 of the panel as shown in FIG. 7A,B. The frustoconical section of the push out pin 2 allows the push out pin 2 to wedge into the aperture so that a shoulder 30 of the push out pin 2 engages the edge of the panel 9 at the counterbore 36. The hold out clip 3 also partially recedes into the elongate slot 7 against the bias of the cantilever, causing the fastener to become substantially immobilized within the panel 9.

Figure 8A:
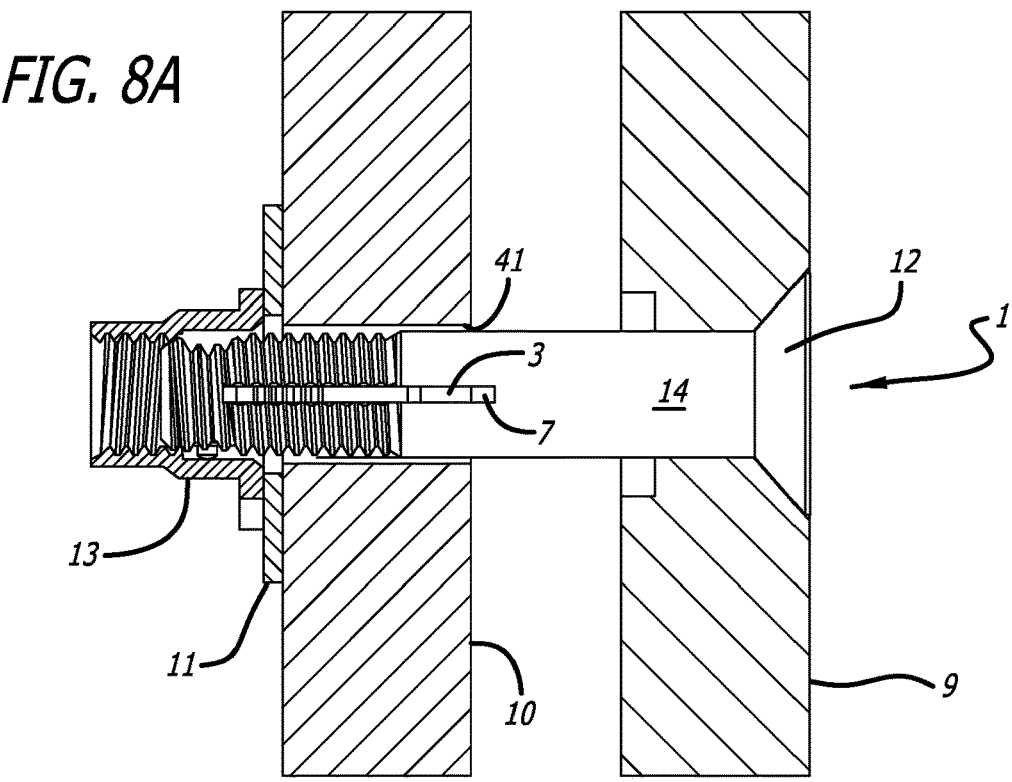
FIG. 8A is a cross sectional front view of the embodiment of FIG. 1 entering a subpanel.
Figure 8B:
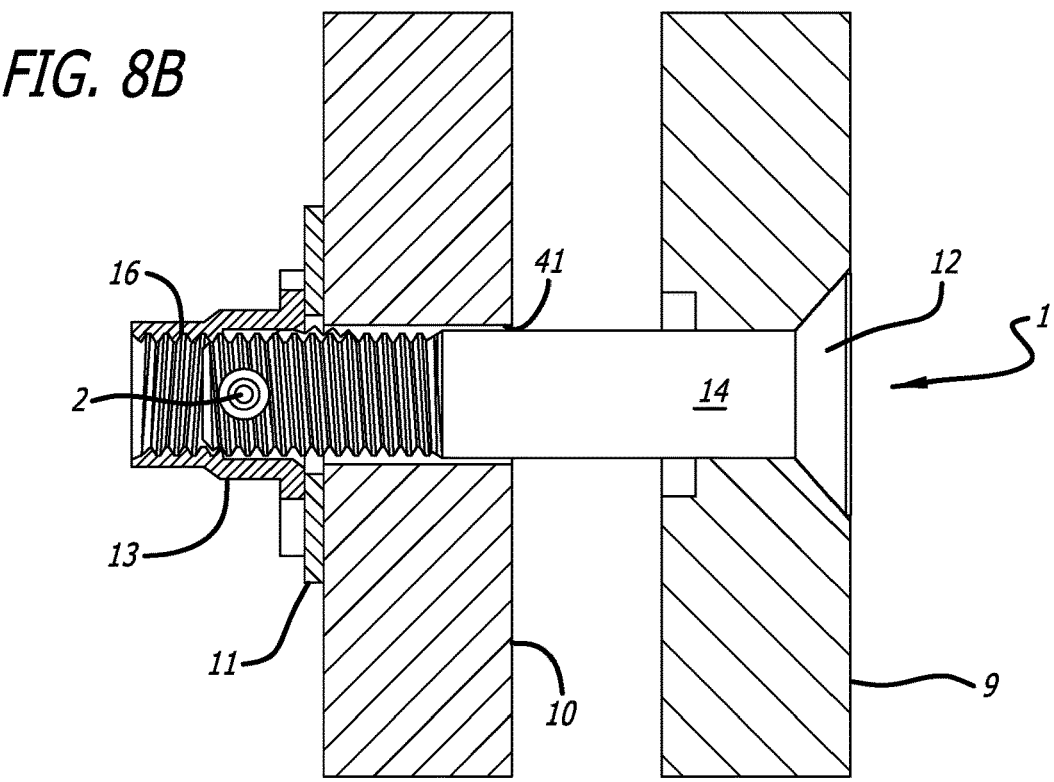
FIG. 8B is a cross sectional side view of the embodiment of FIG. 1 entering a subpanel.

FIGS. 8A,B illustrate the fastener 1 entering a second panel 10, with a nut bracket 11 and lock nut 13 added to the arrangement. As with the primary panel 9, the lock nut 13 compresses the clip 3 into its slot 7, and the push out pin 2 is withdrawn into the chamber 6 so that the fastener 1 can pass through the aperture 41 in the lock nut 13.

Figure 9A:
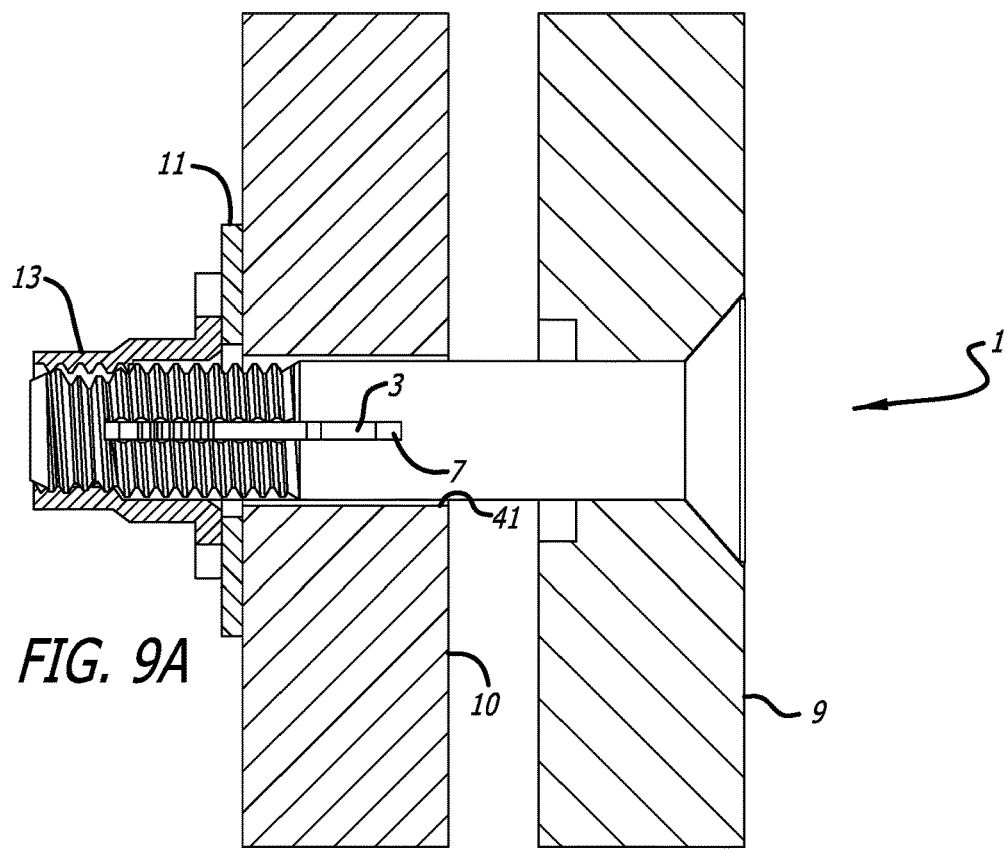
FIG. 9A is a cross sectional front view of the embodiment of FIG. 1 with nut attached.
Figure 9B:
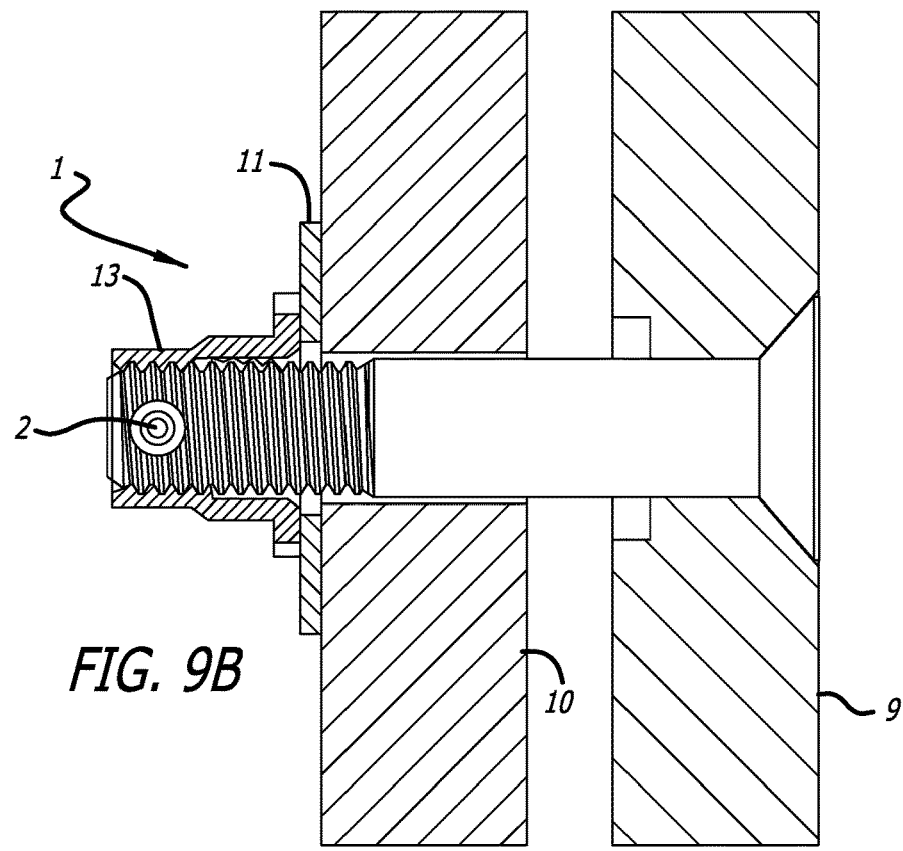
FIG. 9B is a cross sectional side view of the embodiment of FIG. 1 with nut attached.

FIGS. 9A,B illustrate the progression of the fastener 1 further into the second panel 10, as the nut bracket 11 and lock nut 13 travels along the shank 16. The hold-out clip 3 and push out pin 2 are fully receded into their respective slot 7 and chamber 6, allowing the fastener to pass through the lock nut 13.

Figure 10A:
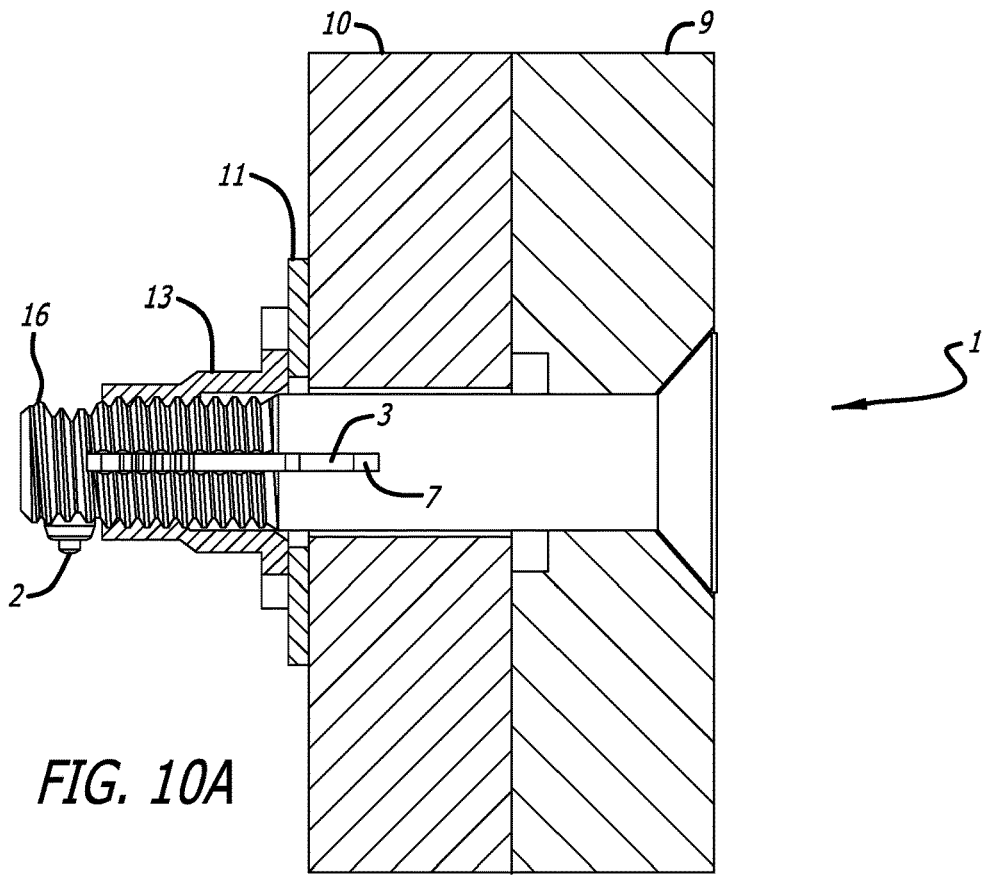
FIG. 10A is a cross sectional front view of the embodiment of FIG. 1 with the panels secured together.
Figure 10B:
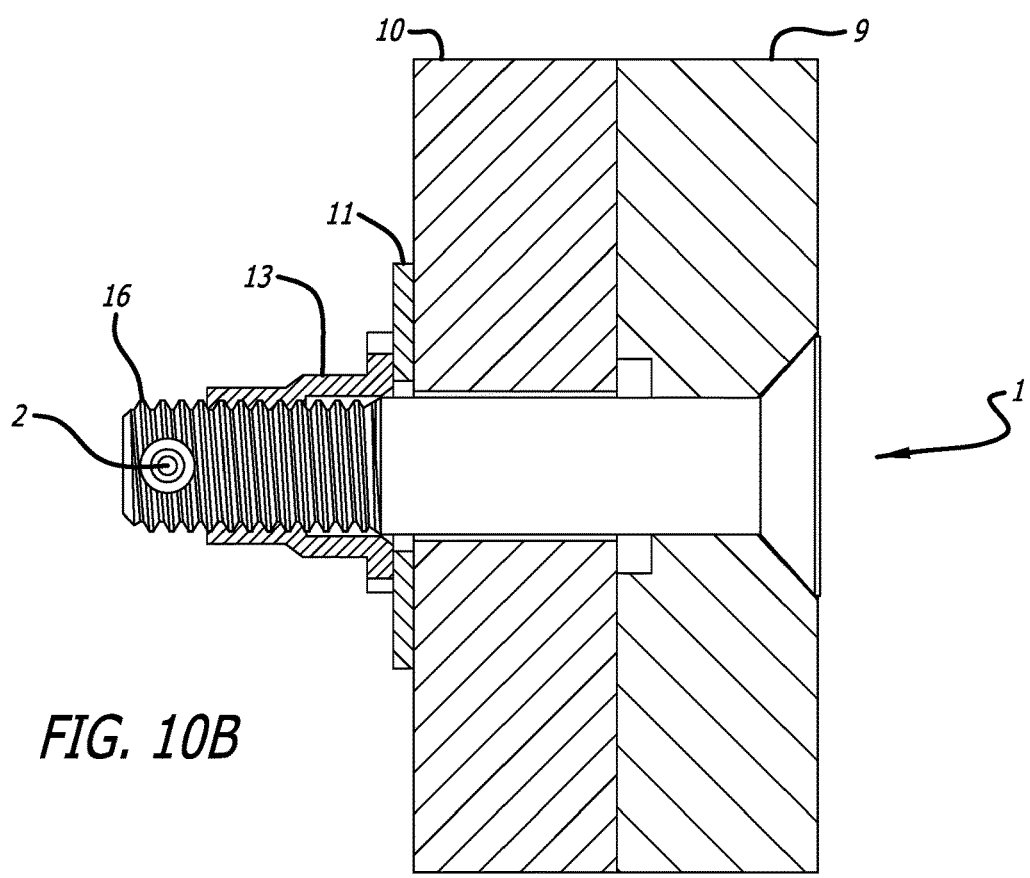
FIG. 10B is a cross sectional side view of the embodiment of FIG. 1 with the panels secured together.

Finally, as shown in FIGS. 10A,B, the primary panel 9 and second panel 10 are compressed by the fastener 1. The lock nut 13 is fully engaged, and the length of the nut's distal edge prevent the clip 3 from extending outside it's slot. The push out pin 2 is located outside of the lock nut assembly, and the profile of the pin 2 allows the lock nut 13 to compress the pin 2 back into chamber 6 when reversing the engagement. This feature allows the removal of the panel 10 with lock nut 13 and nut bracket 11.

Although a preferred embodiment has been disclosed and depicted, the invention is not limited to any specific embodiment and should not be limited in any manner unless expressly stated. The angles, sizes, and shapes of the various elements can be altered without departing from the spirit of the present invention.

We claim:

1. A captive fastener having a head, a neck, and a threaded shaft, the fastener further comprising:
    an elongate longitudinal slot along the threaded shaft retaining a cantilevered hold-out clip having a distal end extending outside the elongate longitudinal slot in an absence of a radially inward force and said distal end including a tip portion curved toward said elongate longitudinal slot such that contact with a surface normal an axis of said shaft directs the hold-out clip fully inside the elongate longitudinal slot, the elongate longitudinal slot sized to enclose the hold-out clip entirely therein; and
    an extendable push out pin disposed within a chamber in the threaded shaft, the extendable push out pin including a compression spring biasing the extendable push out pin radially outward from the chamber to extend out of the shank, the chamber sized to receive the extendable push out pin fully within.

2. The captive fastener of claim 1, wherein the elongate longitudinal slot extends from the neck to a distal end of the threaded shaft.

3. The captive fastener of claim 1, wherein the hold-out clip is secured at the neck of the fastener and has a free end at a distal end of the threaded shaft.

4. The captive fastener of claim 1, wherein the push out pin includes a frustoconical portion.

5. The captive fastener of claim 1, wherein the push out pin and hold-out clip move radially outward at a separation of ninety degrees.

6. The captive fastener of claim 1, wherein the push out pin and the hold-out clip do not move radially outward at a separation of ninety degrees.

* * * * *